(12) United States Patent
Schade

(10) Patent No.: US 7,136,916 B2
(45) Date of Patent: Nov. 14, 2006

(54) METHOD FOR EVENT MANAGEMENT

(75) Inventor: Hendrik Schade, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 681 days.

(21) Appl. No.: 10/094,090

(22) Filed: Mar. 8, 2002

(65) Prior Publication Data

US 2003/0172151 A1    Sep. 11, 2003

(51) Int. Cl.
  G06F 15/173  (2006.01)
  G06F 7/00    (2006.01)
  G06F 17/00   (2006.01)
  G06F 12/00   (2006.01)
  G06F 17/30   (2006.01)

(52) U.S. Cl. .................. 709/223; 709/224; 707/100; 707/101; 707/102; 707/203

(58) Field of Classification Search ................ 709/223, 709/224; 713/201; 345/349
  See application file for complete search history.

(56) References Cited

U.S. PATENT DOCUMENTS

| | | | |
|---|---|---|---|
| 599,179 A * | 2/1898 | Kekic et al. ................ | 206/306 |
| 4,912,637 A | 3/1990 | Sheedy et al. | |
| 5,832,503 A * | 11/1998 | Malik et al. ................ | 709/223 |
| 5,974,237 A * | 10/1999 | Shurmer et al. ............ | 709/224 |
| 6,282,175 B1 * | 8/2001 | Steele et al. ................ | 370/254 |
| 6,678,827 B1 * | 1/2004 | Rothermel et al. ......... | 713/201 |
| 6,839,753 B1 * | 1/2005 | Biondi et al. .............. | 709/224 |
| 2001/0036832 A1 * | 11/2001 | McKay ....................... | 455/456 |
| 2001/0039503 A1 * | 11/2001 | Chan et al. .................... | 705/2 |

OTHER PUBLICATIONS

Lyu, Michael R. and Lorrien K. Y. Lau. "Firewall Security: Policies, Testing, and Performance Evaluation." IEEE, 2000.*

Jagadish, H.V. "Scalable Versioning in Distributed Databases with Commuting Updates," Apr. 1997, IEEE, pp. 520-531.*

Patent Abstracts of Japan Publication No. 2001256253, for Japanese Application 2000066046.

Patent Abstracts of Japan Publication No. 200117461, for Japanese Application 11361397.

Patent Abstracts of Japan Publication No. 2000250794, for Japanese Application 11052621.

Patent Abstracts of Japan Publication No. 2000235561, for Japanese Application 11036895.

Network and Distributed Systems Management, Sloman, Ed. (1994) pp. 303-347.

Jan. 18, 2002 Printout from http:www.cse.ogi.edu/CFST/tut/rdc.html.

* cited by examiner

*Primary Examiner*—Jason Cardone
*Assistant Examiner*—Azizul Choudhury
(74) *Attorney, Agent, or Firm*—Schiff Hardin LLP

(57) ABSTRACT

In a method for configuring a network of managed objects with a set of templates comprising event detection criteria in the context of network monitoring, a new template, which comprises at least one event detection criterion associated with a type of managed object, is developed. The new template, including a specific identifier, is stored on a table of a database which has a plurality of tables, of which each table corresponds to a type of managed object within the network. Each table contains at least one previously developed template, which includes a specific identifier and comprises at least one event detection criterion corresponding to the relevant type of managed object. After that, a set of templates which comprises the new template and at least one previously developed template is defined, so that the set of templates contains at least one template from among each table. Finally, the network is updated, so that each managed object contains the relevant template from the set of templates.

5 Claims, 6 Drawing Sheets

FIG 3

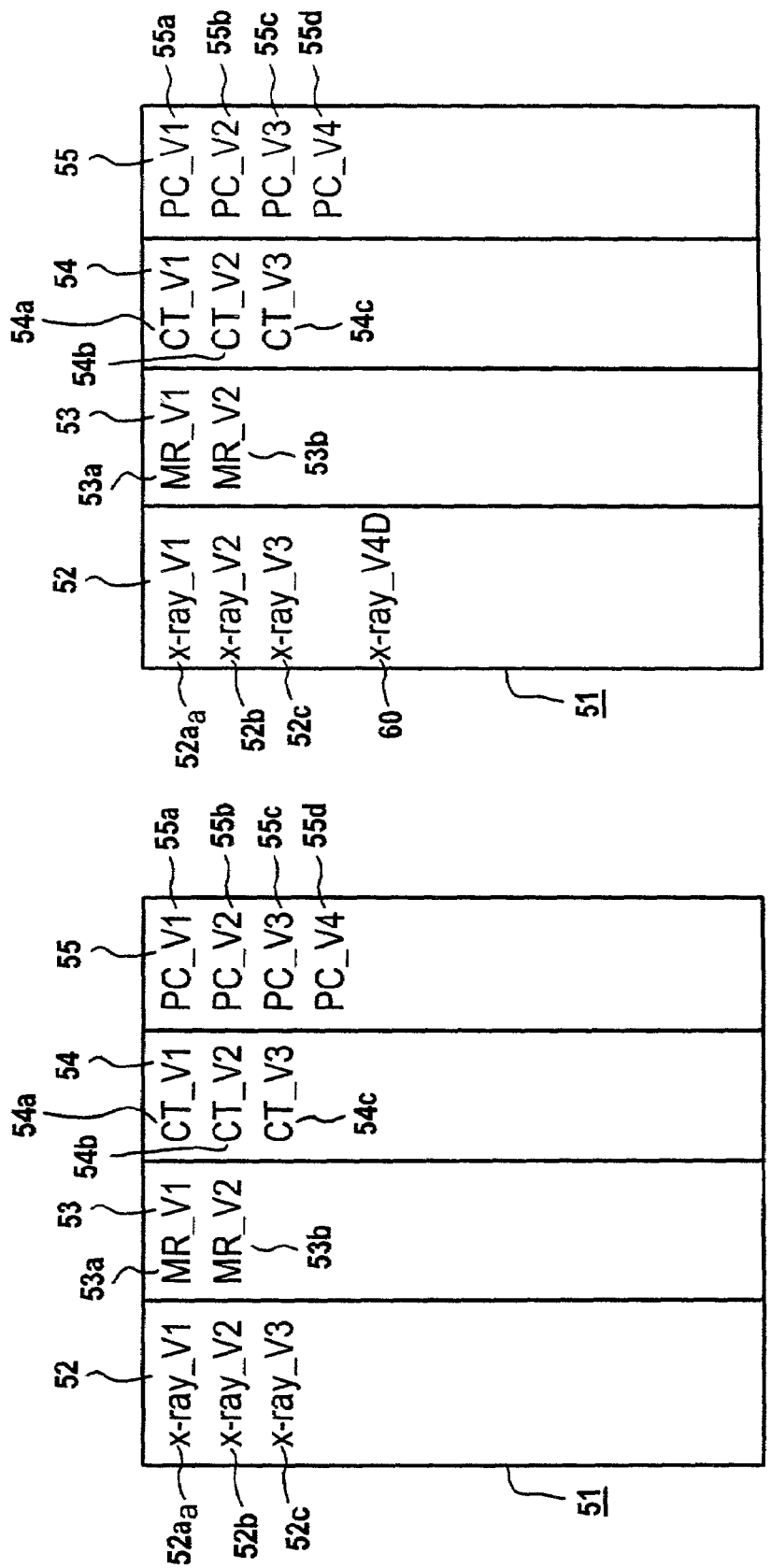

METHOD FOR EVENT MANAGEMENT

BACKGROUND OF THE INVENTION

1. Field of the Invention

The invention relates to network monitoring, and specifically, to event management.

2. Description of the Prior Art

The purpose of monitoring a network is to manage network performance, discover and solve network problems, and plan for network growth. According to Morris Sloman (Editor), "Network and Distributed Systems Management", Addison-Wesley, England, 1994, pg. 303, monitoring can be defined as the process of dynamic collection, interpretation, and presenting of information concerning objects or software processes under scrutiny. Monitoring can be used for general network management, such as performance management, configuration management, fault management, or security management. One application of monitoring is event reporting which is explained below using definitions taken from the aforementioned text at pp. 303 to 347.

The network to be monitored is comprised of one or more managed objects. A managed object is defined as any hardware or software component whose behavior can be monitored or controlled by a management system. Hardware components may be hubs, routers, computers, bridges, etc. Each managed object is associated with a status and a set of events. The status of a managed object is a measure of its behavior at a discrete point in time. An event is defined as an atomic entity which reflects a change in the status of the managed object. The behavior of the managed object can be defined and observed in terms of its status and events.

The status of the managed object lasts for a certain time period. Examples of a status are "process is idle" or "process is running". An event occurs instantaneously. Examples of an event are "message sent" or "process started". Since the status of a managed object is normally changing continuously, the behavior of the managed object is usually observed in terms of a distinguished subset of events, called events of interest. Events of interest reflect significant changes in the status of the managed object.

In order to monitor the events of interest, events of interest must be detected. An event is said to have occurred when the conditions which are defined by event detection criteria are satisfied. These conditions are detected by appropriate instrumentation, such as software and hardware probes or sensors inserted in the managed object.

Event detection may be internal within or external from the managed object. Internally performed event detection is typically performed as a function of the managed object itself. Externally performed event detection may be carried out by an external agent which receives status reports of the managed object and detects changes in the status of the managed object.

The occurrence of the event may be detected in real-time or delayed. Once the event is detected, an event report is generated at the managed object. The event report may comprise an event identifier, type, priority, time of occurrence, the status of the managed object immediately before and after the occurrence of the event, and other application-specific status variables.

In order to monitor the dynamic behavior of the managed object, the event report may be conveyed from the managed object to a central unit. At the central unit event reports may be gathered, visualized, and recorded. The central unit may be a Network Management Station (NMS) on which an appropriate software, usually called a manager, resides. The manager executes management applications that monitor and control the managed objects. Physically, an NMS, sometimes called a console, is usually an engineering workstation with a fast CPU, megapixel color display, substantial memory, and abundant disk space. The NMS may comprise a database on which incoming reports sent by the managed objects, such as event reports, are stored.

Received reports can be viewed with the Graphical User Interface (GUI) of the NMS.

In order to carry out event detection, each managed object must know its event detection criteria. The event detection criteria for a specific managed object can be defined using an appropriate template. Once this template is created, the relevant managed object or its agent will be configured with that template.

Figure 3:
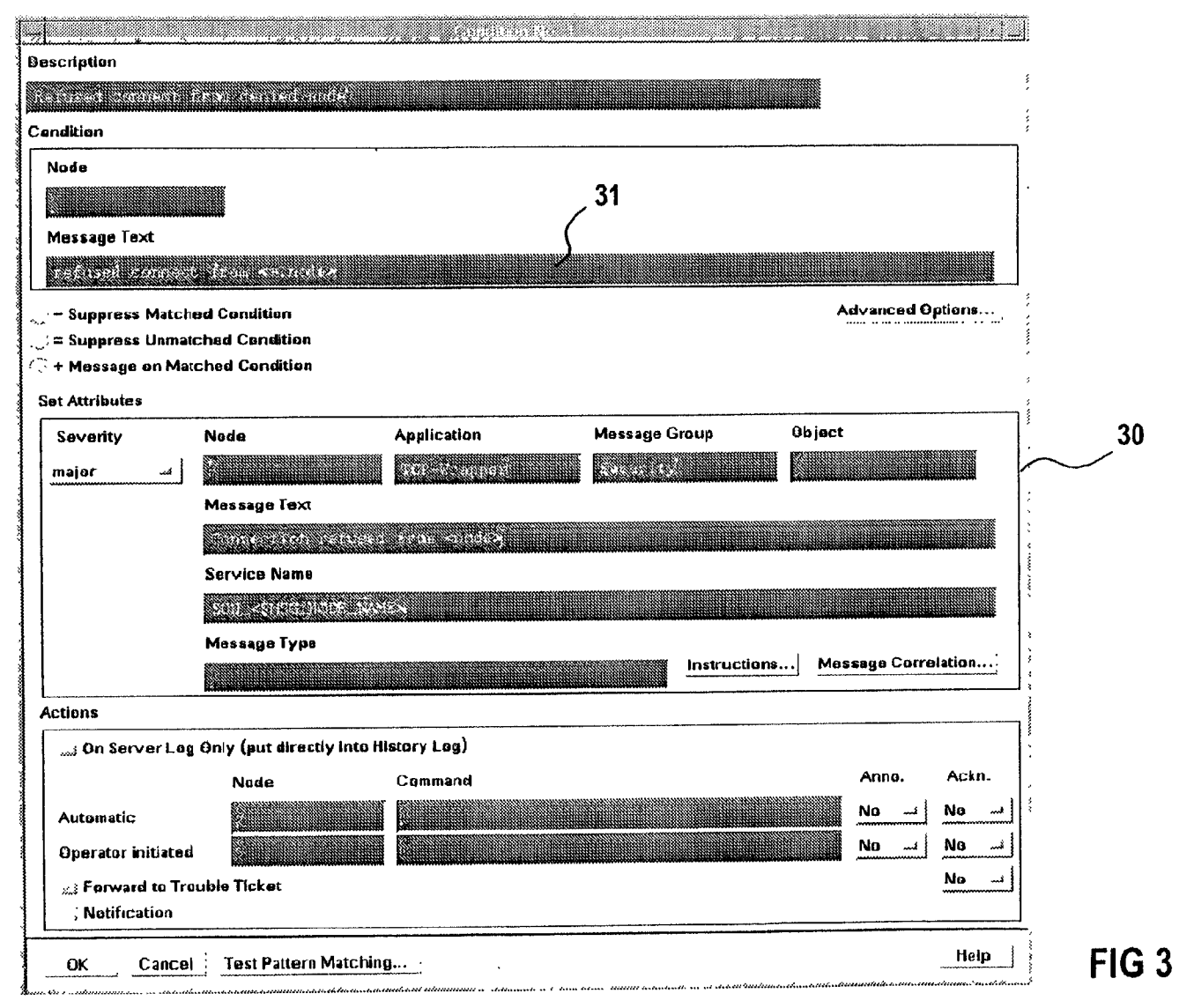

FIGS. 1 to 3 show an example of such a template 1 for a managed object, which is a computer run by the operating system Sun-Solaris. The managed object is monitored by the Network Management System HP OpenView, which monitors its logfile. Template 1 has a name-field 2 for defining template 1. In this case, the name of template 1 is "R0_HS_MST_VB22F_Syslog". Additionally, template 1 has a description-field 3, in which a short description of the event detection criteria may be written. Template 1 has also a field 4 which specifies the path and the name of the file to be monitored. The name of the logfile is "syslog". Furthermore, the time period in which the logfile "syslog" is automatically checked by the managed object for a new entry is defined by a field 5 of template 1. In this example, the logfile "syslog" is checked each minute.

The actual event detection criterion or event detection criteria of the managed object are defined utilizing a list 20 which is shown in FIG. 2. For this example, list 20 contains only one event detection criterion which is: "Refused connect from denied node".

FIG. 3 shows a list 30 which is used to define the message of an event report sent from the managed object to an NMS if an event defined by the event detection criterion occurrs. The message can be written in a message test field 31. For this example, the message of the event report is "Connection refused from <*.node>", when there is an unauthorized attempt to log on the managed object. "<*.node>" is actually a wildcard, which is replaced by the actual system's name from which the unauthorized log on was attempted.

Usually a network contains different types of managed objects. Those different types of managed objects may be different types of computer controlled devices or apparatuses, such as magnetic resonance or computed tomography apparatuses. Furthermore, events of interest are normally different for each of the different types of managed objects, resulting in the development of different templates which comprise event detection criteria specific to the different types of managed objects. For example, an event of interest specific to the magnetic resonance apparatuses may be a failure of one of their high frequency components, while an event of interest specific to the computed tomography apparatuses may be a problem associated with their x-ray generating components.

In addition, a template related to a type of a managed object may be modified over time, because a user monitoring the network may be interested in a modified set of events of interest involving that type of managed object. Then, not only a new template for that type of a managed object has to be developed and tested, but the managed objects of that type have to be reconfigured with the newly developed template, and also the modifications have to be recorded.

If the network is comprised of relatively many different types of managed objects and their event detection criteria are frequently modified, then administrating the process of developing and testing the new template, reconfiguring the relevant managed objects, and reporting the modifications may be particularly cumbersome.

SUMMARY OF THE INVENTION

It is an object of the present invention to provide a method which enables easy administration of templates having modified event detection criteria for managed objects within a network.

This object is achieved in accordance with the present invention in a method having the steps of: developing a new template which comprises at least one event detection criterion associated with a type of a managed object; storing the new template, including a specific identifier on a table of a database wherein that database has a plurality of tables of which each table corresponds to a type of managed object out of a plurality of types of managed objects, the new template is stored on one of those tables, and each of those tables contains at least one previously developed template which includes a specific identifier and comprises at least one event detection criterion corresponding to the relevant type from among the plurality of types of managed objects; defining a set of templates which comprises the new template and at least one of the previously developed templates, so that the set of templates contains at least one template from each table; and updating a network which is comprised of managed objects which are of the type from the plurality of types of managed objects, so that each managed object contains the relevant template from among the set of templates.

The inventive method can be advantageously used for maintaining and administrating a network which is comprised of different types of managed objects. Different types of managed objects may be different types of computers having, for instance, different operating systems. Different types of managed objects can also be different types of computer controlled devices or apparatuses, such as different types of medical apparatuses.

Additionally, the inventive method utilizes a database which is comprised of a plurality of tables. Each of the tables corresponds to one of the types of managed objects from the network. Each table contains at least one template with at least one event detection criterion being specific to the type of managed object the table corresponds to. Furthermore, each template can be identified by its assigned identifier.

According to the inventive method, a new template with at least one detection criterion for one of the types of managed objects of the network has been developed. The new template including its identifier is stored on the relevant table of the database. The new template has been developed, for example, to modify event detection criteria for one type of managed objects of the network. As a result, the database comprises the newly developed template as well as previously developed templates relevant for the network, enabling easy administration of the newly developed templates and previously developed templates, for example, for reporting or revision purposes.

After storing the new template on its relevant table, the set of templates is then defined. The set of templates comprises the new template and previously developed templates, so that it contains templates for all types of managed objects of the network.

Finally, according to the inventive method, the network is updated, so that each managed object of the network is configured with its relevant template from among the set of templates.

Consequently, the inventive method enables, for instance, an administrator of the network to easily oversee the current configuration of the network. The administrator also has a good overview of previously and newly developed templates and will be able to easily comprehend modifications of the definition of event detection criteria for a specific type of a managed object which have been carried out over time.

The inventive method may additionally comprise, before the step of updating the network, the step of testing the set of templates on a test-network which simulates the network. This assures a troublefree reconfiguration of the managed objects of the network.

The database utilized for the inventive method may be a Revision Control System (RCS) database. Revision Control Systems are particularly advantageous if one wants to manage multiple revisions of text files by automating their storage, retrieval, logging, identification, and merging. Revision Control Systems are useful for texts that are revised frequently, for example programs, documentation, graphics, papers, form letters, etc. (see, for example http://www.cse.ogi.edu/CFST/tut/rcs.html).

In accordance with a variant of the inventive method and especially to enable easy definition of the set of templates, the specific identifiers are version numbers. Templates stored on a specific table from among the plurality of tables can be identified according to their related version numbers and the set of templates can be defined by choosing templates according to their version numbers.

According to the inventive method, the network may be monitored with an agent-manager network management system. The network is updated by configuring agents which reside on the managed objects with relevant templates. The agent-manager network management system is comprised of a manager, which is software residing at a Network Management Station, and one or more agents. An agent is software residing at the managed object. The agent is configured to generate and send the event report to the manager. Network management systems are commercially available. Examples of network management systems are HP OpenView, IBM NetView, and Novel NetWare.

The above object is also achieved in accordance with the invention by means of a method comprising the steps of: defining a set of templates from among a plurality of templates according to version numbers of templates from the plurality of templates, wherein the plurality of templates is stored on tables of a database, each of the tables corresponding to a specific type of managed object and each of the templates containing at least one event detection criterion corresponding to its relevant specific type of managed object; and configuring managed objects which relate to the tables of the database and are at least a part of a network, so that each of the managed objects is configured with its relevant template.

The inventive method can preferably be used to administer templates which are used to define event detection criteria for different types of managed objects of a network. The inventive method is especially advantageous if templates with modified event detection criteria need to be administered, reported, and filed. The inventive method utilizes a database which may be a Revision Control System (RCS) database. Each table of the database corresponds to a type of managed object of the network. Each table comprises one or more templates with event detection criteria assigned to its relevant type of managed object. The templates of a table can be identified by their version numbers. Therefore, an administrator of the network can easily check how many different versions of a template for a specific type of managed object have been developed.

According to the inventive method, the set of templates is defined. The set of templates comprises templates for each type of managed objects of the network. After defining the set of templates, the managed objects are configured so that each managed object has its relevant template.

DESCRIPTION OF THE DRAWINGS

FIG. 3, as discussed above, is a list for defining a message of an event report.

FIGS. 5 to 7 respectively illustrate structures of a database for use by the network.

DESCRIPTION OF THE PREFERRED EMBODIMENTS

Figure 4:
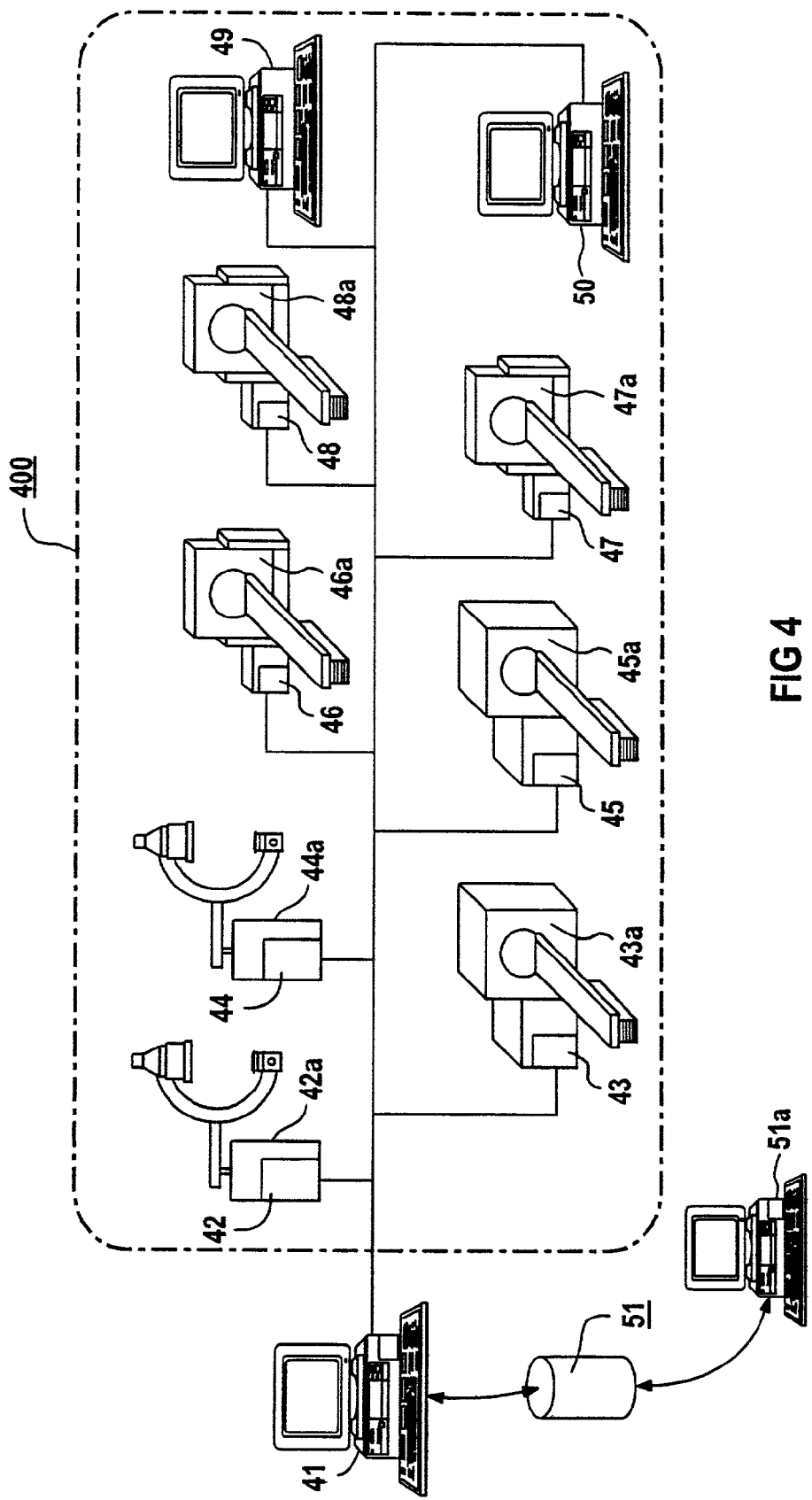
FIG. 4 is a pictoral diagram of a network operating in accordance with the inventive method.

FIG. 4 depicts an example of a network 400 which is comprised of several managed objects 42 to 50. Managed objects 42 and 44 are computer controlled x-ray apparatuses 42a and 44a, corresponding to a first type of managed object which is referred to as "x-ray apparatus". Managed objects 43 and 45 are computer controlled magnetic resonance apparatuses 43a and 45a corresponding to a second type of managed object which is referred to as "MR-apparatus". Managed objects 46, 47, and 48 are computed tomography apparatuses 46a, 47a, and 48a, corresponding to a third type of managed object which is referred to as "CT-apparatus". Managed objects 49 and 50 are standard PCs connected to the network 400, corresponding to a fourth type of managed object which is referred to as "PC".

The network 400 is monitored with a Network Management Station (NMS) 41 which physically is a computer connected to the network 400 using the agent-manager network management system HP OpenView. On the NMS 41 resides a manager which communicates with agents residing on the managed objects 42 to 50. The manager is software configured to receive reports sent by the agents. An agent is software configured to control and detect significant changes in the status of its corresponding managed object according to a predefined set of event detection criteria. In the present exemplary embodiment, agents of the same type of managed object are configured with essentially the same set of event detection criteria specific to that type of managed object. Therefore the agents of the managed objects 42 and 44, which are of the type "x-ray apparatus", are configured with a set of event detection criteria specific to x-ray apparatuses; the agents of managed objects 43 and 45, which are of the type "MR-apparatus", are configured with a set of event detection criteria specific to magnetic resonance apparatuses; the agents of managed objects 46, 47, and 48, which are of the type "CT-apparatus", are configured with a set of event detection criteria specific to computed tomography apparatuses, and managed objects 49 and 50, which are of the type "PC", are configured with a set of event detection criteria specific to PCs connected to the network 400.

Figure 1:
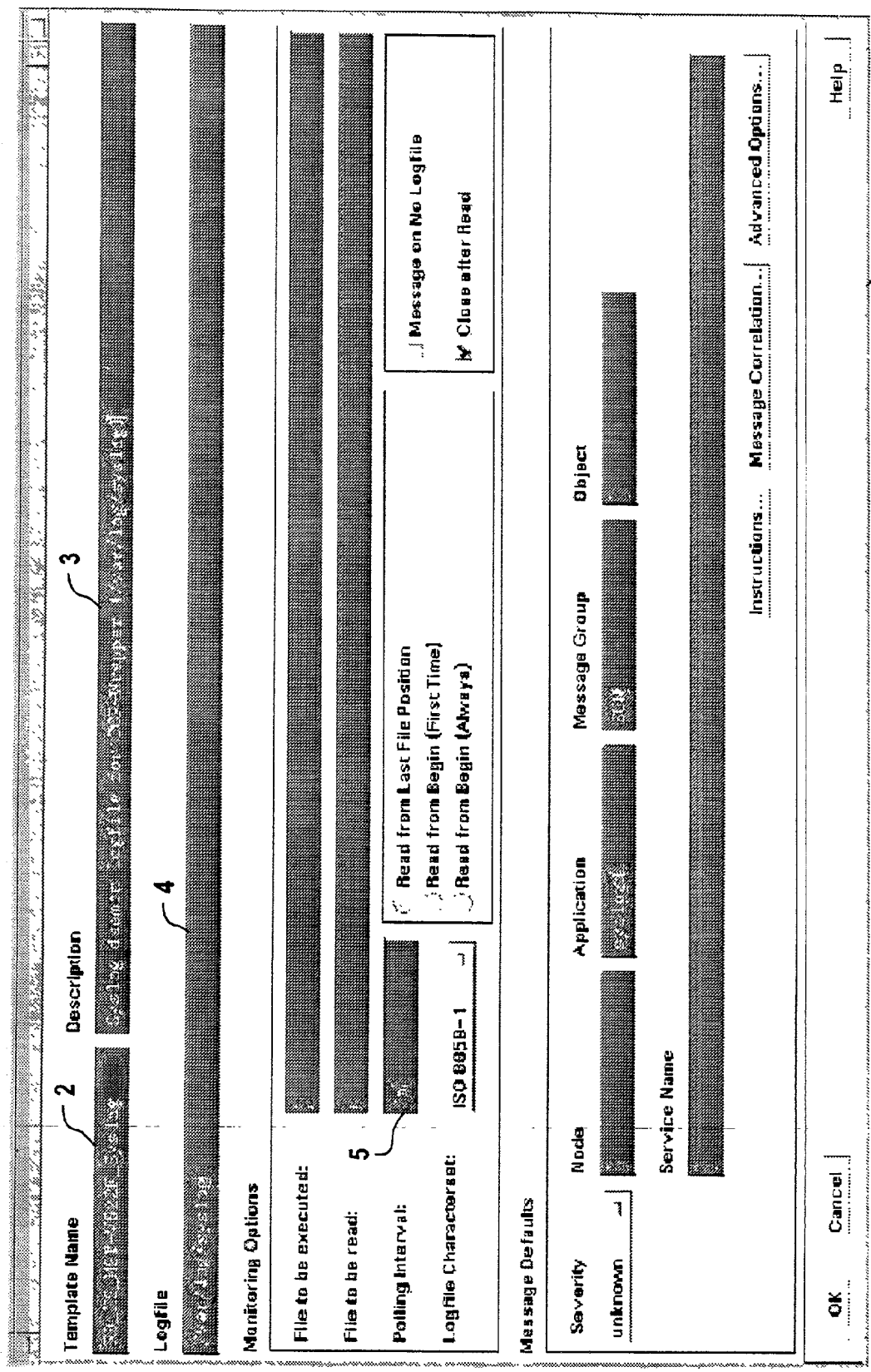
FIG. 1, as discussed above, is a template for defining an event detection criterion.
Figure 2:
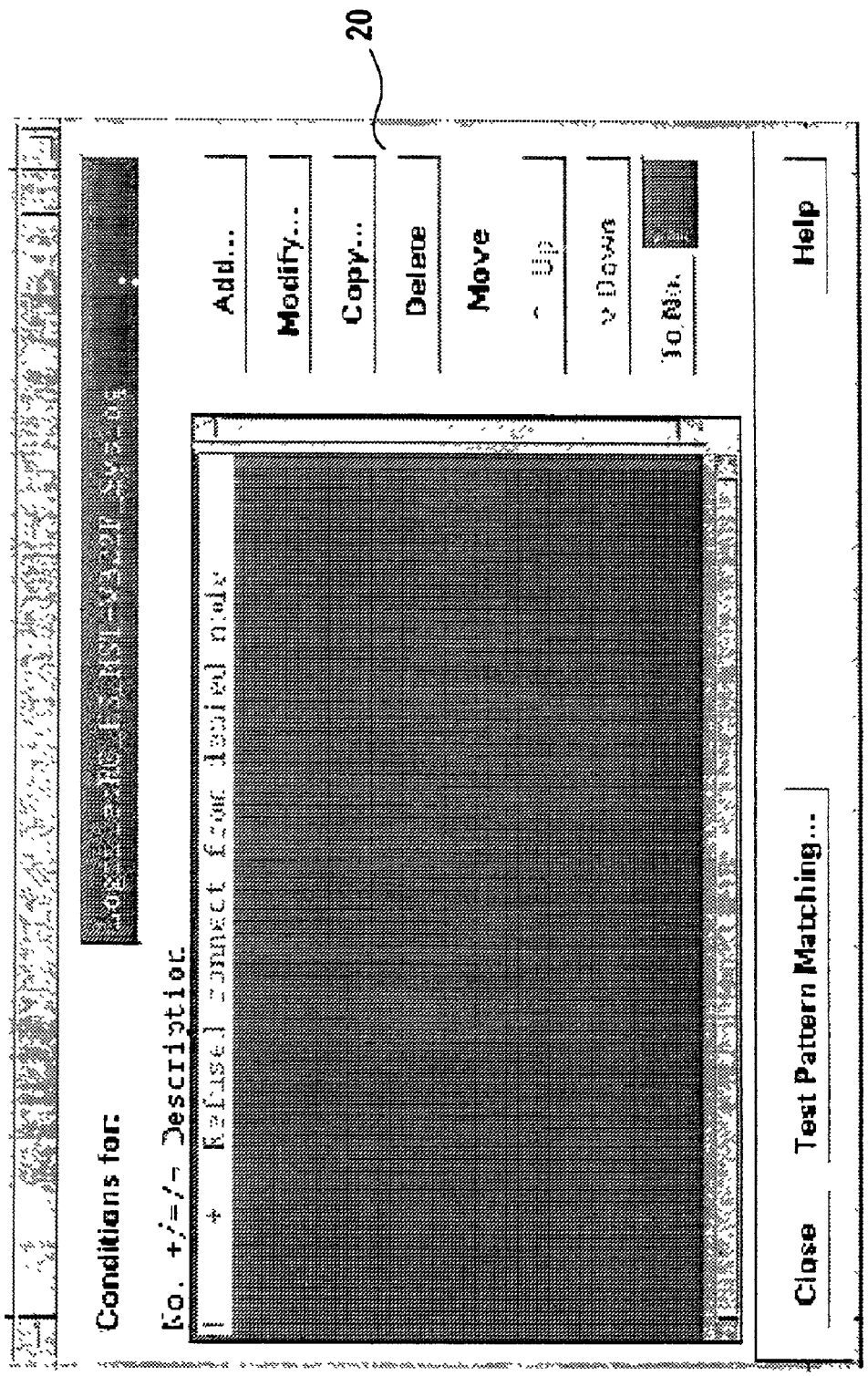
FIG. 2, as discussed above, is the list associated with the template of FIG. 1 to define the actual event detection criterion.

Each set of event detection criteria is defined using a template similar to that depicted in FIG. 1, which has been described in the introduction. In order to have an overview of the set of detection criteria for which each agent of the managed objects 42 to 50 is configured, templates containing the sets of event detection criteria are stored on tables of a database 51, whose structure is shown in FIG. 5 in more detail.

The database 51 contains four tables 52 to 55 on which the aforementioned templates are stored. Table 52 corresponds to the managed objects of the type "x-ray apparatus", table 53 corresponds to managed objects of the type "MR-apparatus", table 54 corresponds to managed objects of the type "CT-apparatus", and table 55 corresponds to managed objects of the type "PC".

Tables 52 to 55 of database 51 do not only contain templates which comprise those sets of event detection criteria with which the managed objects 42 to 50 are currently configured, but also templates which comprise sets of event detection criteria which were used in the past. For example, table 52, which corresponds to managed objects of the type "x-ray apparatus", comprises templates 52a, 52b, and 52c. Templates 52a, 52b, and 52c can be differentiated by their names and particularly by the identifiers "V1", "V2", and "V3" attached to the names of the templates 52a, 52b, and 52c, respectively. The identifiers "V1", "V2", and "V3" are version numbers for this example. Table 53, which corresponds to managed objects of the type "MR-apparatus", comprises templates 53a and 53b; table 54, which corresponds to managed objects of the type "CT-apparatus", comprises templates 54a, 54b, and 54c, and table 55, which corresponds to managed objects of the type "PC", comprises templates 55a to 55d.

For the present exemplary embodiment, a team of technicians (not shown in the Figures) develop a new template containing a modified set of event detection criteria for managed objects of the type "x-ray apparatus", i.e. for the managed objects 42 and 44. After the team of technicians develop the new template, they pretest it and store it on the table 52 of the database 51. Since there are templates 52a, 52b, and 52c having version numbers "V1", "V2", and "V3", respectively, stored on table 52, the new template is titled "x-ray_V4_D" and has the reference sign 60, as shown in FIG. 6. In this context "V4" means version 4 and the suffix "D" means that template 60 has been recently developed.

After the new template 60 was stored on table 52, an operator (not shown in the Figures), who monitors the network 400 with the NMS 41, defines a set of templates. This set of templates comprises the new template 60 and one template for each of the tables 53, 54, and 55. For the present exemplary embodiment, the set of templates comprises, besides the new template 60, template 53b of table 53, template 54c of table 54, and template 55d of table 55.

Figure 7:
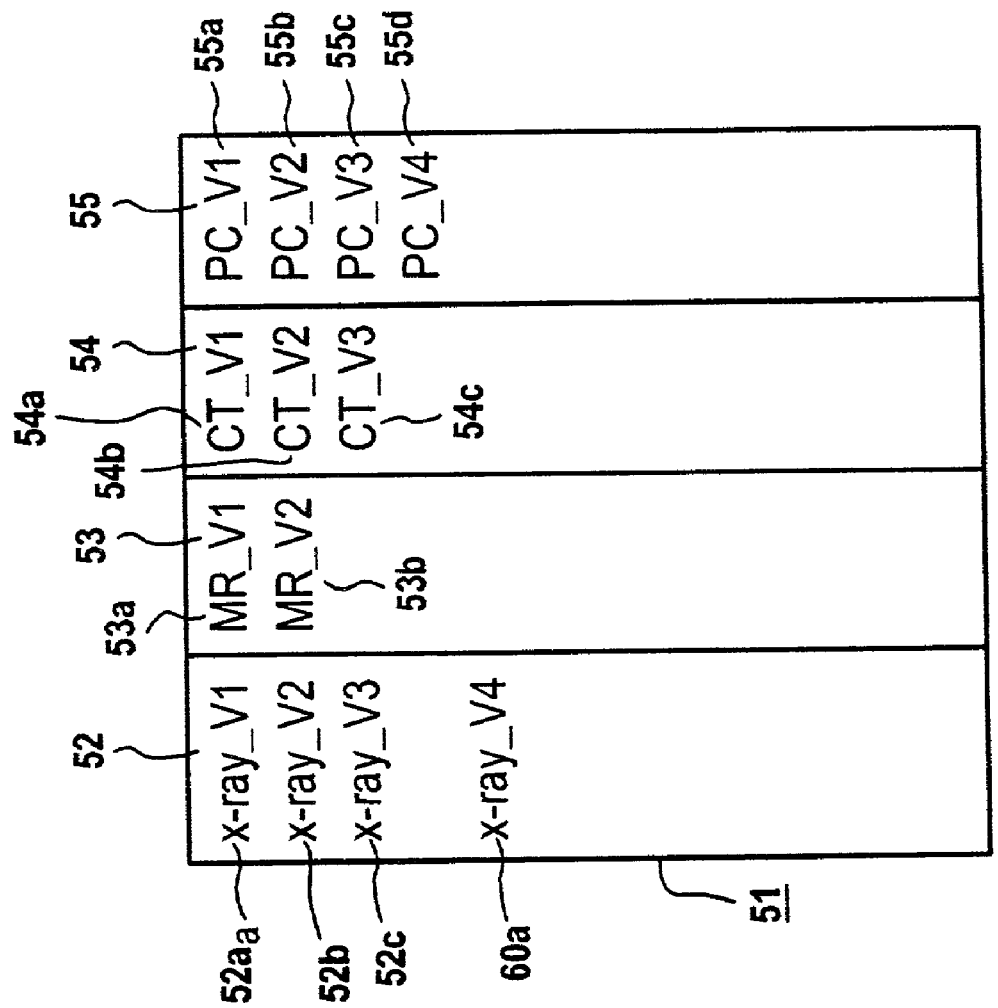

After defining the set of templates, the operator loads this set of templates on a computer 51a. On computer 51a runs an appropriate software which is configured to simulate the network 400, so that the operator can test the set of templates. Since the new template 60 was carefully developed, the test of the set of templates is successful. As a result, the operator renames the template 60 "x-ray_V4_D" as "x-ray_V 4", as shown in FIG. 7. The renamed template is assigned with the reference sign 60a as shown in FIG. 7. The deletion of the suffix "D" of the name of the new template 60 means in this context that the operator has successfully tested the new template 60 on the computer 51a and that this template can be used for configuring the appropriate managed objects of the network 400.

After renaming the new template 60 as template 60a the operator configures the agents of the managed objects 42 and 44 with the set of event detection criteria defined by template 60a. Since in the present exemplary embodiment the agents of the remaining managed objects of the network 400 are already configured with the relevant templates from among the set of templates, the operator does not need to reconfigure them.

Although modifications and changes may be suggested by those skilled in the art, it is the intention of the inventor to embody within the patent warranted hereon all changes and modifications as reasonably and properly come within the scope of his contribution to the art.

The invention claimed is:

1. A method for updating a plurality of medical devices of respectively different types that communicate with a network having a network interface operable by a user, comprising the steps of:

in a database accessible via said interface, electronically storing a plurality of tables respectively corresponding to said different types of said medical devices;

in each of said tables in said database, electronically storing a plurality of predetermined templates respectively for said different types of medical devices, each predetermined template comprising an identifier that designates the medical device to which the table corresponds, and at least one event detection criterion, unique to the type of medical device designated by the identifier that, when satisfied, denotes an occurrence of said at least one event;

developing a new template comprising a new identifier and a new event detection criterion for the type of medical device designated by the type identifier of the new template;

electronically storing said new template in said database in one of said plurality of tables that corresponds to the same type of medical device as said new template;

via said network interface, manually defining a set of templates respectively for said plurality of medical devices, said set of templates comprising said new template and at least one of said predetermined templates so that said set of templates contains templates with respective identifiers for each of said different types of said medical devices; and updating all of said plurality of medical devices by transmitting the templates in said set of templates to the respective medical devices dependent on the respective identifiers thereof.

2. A method as claimed in claim 1 comprising, before updating said network, testing said new template in a test network that simulates said network.

3. A method as claimed in claim 1 comprising employing a Revision Control System (ROS) as said database.

4. A method as claimed in claim 1 comprising using said identifier of each template to designate a version of that template, and wherein the step of manually defining said set of templates comprises selecting templates from said tables dependent on said version represented by the respective identifier.

5. A method as claimed in claim 1 wherein each of said medical devices comprises a configurable agent, and wherein the step of updating all of said plurality of medical devices comprises re-configuring the respective agents of all of said plurality of medical devices using the respective templates in said set of templates.

* * * * *